United States Patent [19]

Theobald

[11] 4,265,582

[45] May 5, 1981

[54] ARRANGEMENT FOR STORING OF PALLETS USED FOR HOLDING MATERIAL

[76] Inventor: Adolf Theobald, Merschstrasse 5, 5758 Fröndenberg-Warmen, D, Fed. Rep. of Germany

[21] Appl. No.: 912,466

[22] Filed: Jun. 5, 1978

[30] Foreign Application Priority Data

Jun. 8, 1977 [DE] Fed. Rep. of Germany ....... 2725789

[51] Int. Cl.³ .................... B65G 1/00; B65G 65/00
[52] U.S. Cl. .................................. 414/279; 187/18; 414/281
[58] Field of Search ............... 414/267, 277, 279, 280, 414/281, 282, 283, 284, 286, 140; 187/18

[56] References Cited

U.S. PATENT DOCUMENTS

| | | | |
|---|---|---|---|
| 2,984,367 | 5/1961 | McIntyre | 414/140 |
| 3,412,873 | 11/1968 | Barker | 187/18 |
| 3,455,469 | 7/1969 | Evans | 414/280 |
| 3,734,312 | 5/1973 | Hickinbotham | 414/267 X |
| 3,779,403 | 12/1973 | Young | 414/279 |
| 3,964,619 | 6/1976 | Irmler | 414/281 |
| 3,977,542 | 8/1976 | Stolzer | 414/281 |
| 4,088,232 | 5/1978 | Lilly | 414/282 |
| 4,109,805 | 8/1978 | Wagner | 414/277 |

Primary Examiner—Stephen G. Kunin
Assistant Examiner—Edmond G. Rishell, Jr.
Attorney, Agent, or Firm—Max Fogiel

[57] ABSTRACT

An arrangement for the storage of pallets which are used to hold material of lengthy shape. A plurality of shelves are located and fixed next to one another, and they are accessible from at least one broad side via a loading and removal device which travels transversely to the shelves. A plurality of stacked compartments accommodate the pallets, and have a guided loading and removal device which travels underneath the shelves which are located above floor level. An additional guided gantry-like loading and removal device travels above the shelves. The loading and removal device, furthermore, travels underneath the shelves, and may be constructed in the form of a traveling lifting table with a device for the loading and removal of the pallets. Guides may be fixed to the vertical members of the shelves for the lateral support of a platform of the lifting table. A lifting mechanism of a gantry crane may be formed by consoles guided on supports of the gantry. These consoles may be pivotable into the vertical plane of the supports.

8 Claims, 8 Drawing Figures

ARRANGEMENT FOR STORING OF PALLETS USED FOR HOLDING MATERIAL

BACKGROUND OF THE INVENTION

The present invention relates to an arrangement for storing pallets used for holding material, particularly for storing long material. A plurality of shelves are located and fixed next to one another and are accessible from at least one broad side via a loading and removal device which travels transversely to the shelves. A plurality of stacked compartments (bins) accommodate the pallets.

The loading and removal of pallets into and from such storage arrangements has been accomplished in the past by means of an overhead or gantry crane which travels transversely to the shelves and is equipped with a loading and removal device which can be lowered into the passage enclosed by the accessible lengthwise side of two successive shelves (German Laid-Open Document No. 2 164 444). During the storage of pallets, the palletreadied at a broad or face side of the storage bin is lifted by the crane to a level above the shelves, and is moved by the crane above the shelves up to the passageway where the shelf is located in which the pallet is to be stored. The pallet is then lowered in the passageway to the level of the bin where the pallet is to be stored, and the pallet is then moved into the assigned bin. The removal of pallets from the storage is done in the opposite order sequence.

The loading and removal process during which the pallets must be lifted above the shelves is time-consuming. In addition, overhead or gantry cranes require space, at the expense of storage capacity.

It has already been proposed to move stored items underneath upright shelves with a separate transport device into the passageway from which the shelf and particularly the bin where the stored item is to be deposited is accessible, and to lift the stored item with a separate lifting hoist installed above the passageway to the level of the bin where it is to be stored, and into which it is then deposited (German Laid-Open Document No. 2 311 762). This approach also requires overhead space at the expense of storage capacity. Furthermore, additional equipment for loading and removal of loads from the transport equipment traveling underneath the shelves is required outside the storage arrangement.

It is, therefore, an object of the present invention to provide arrangements of the above type so that the stored item can be transferred more quickly.

Another object of the present invention is to provide an enormous reduction of warehousing costs.

A further object of the present invention is to provide an arrangement which is substantially simple in construction and may be economically fabricated.

SUMMARY OF THE INVENTION

The objects of the present invention are achieved by providing a loading and removal device which travels underneath the shelves, which are above floor level, and is forced along a predetermined path.

The loading and removal arrangement in accordance with the present invention—during the entire loading and removal process—prequires no transfer of the pallet containing the stored items; rather, during the loading, as soon as it is deposited outside the storage on the traveling loading and removal arrangement, it is moved into one of the passageways extending between the shelves with the same arrangement, and lifted in the passageway to the level of a bin to which the pallet is to be moved. Removal is done accordingly.

The transport of the stored item is done much faster than with the known arrangements of this type, since when lifting the stored items above the shelves during loading and removal of the stored items, much longer distances have to be traversed and material moved by overhead or gantry cranes cannot be moved as fast as items transported close to the ground in accordance with the present invention. In comparison with the already known transverse transport of the stored items underneath the shelves in conjunction with overhead or gantry cranes for lifting the stored items, the time-consuming transfer during transport is dispensed with. The range of action and the field of application of the loading and removal arrangement of the present invention, while requiring a smaller investment, is greater than with the overhead or gantry cranes used up to the present for the horizontal and/or vertical transport of the stored items.

With this basic concept, the space reserved otherwise for the overhead or gantry crane can be utilized for storage. Also, there is the possibility to locate wall and ceiling surfaces directly on the shelves, saving the additional overhead structure.

In a further embodiment of the present invention, an overhead crane traveling above the arrangement may be provided as loading or removal device. By means of it, the pallet transport during loading or removal can be made more economical since the simultaneous or overlapping loading or removal of two pallets is possible without the transport of one pallet interfering with the transport of the other pallet.

Particularly efficient is a loading and removal device in the form of a traveling lifting table with a device for loading and removal of the pallet since such lifting tables in the lowered (stored) condition have a comparatively low height and a correspondingly low ground clearance is sufficient, thus optimizing the storage capacity.

Particularly with high storage facilities and commensurate lift of the lifting table, it is advisable to guide the table or the lifting members; with storage facilities for storing lengthy items, such guidance is absolutely necessary. Such guides may be fastened to the vertical members of the shelves.

The lift mechanism of the overhead crane comprises consoles which can be guided by the supports of the gantry and which can be swung into the vertical plane of the supports; devices for loading and removal of the pallets are located on these consoles. This makes it possible to move the gantry crane without having to lift the lifting mechanisms above the shelves, resulting in shorter distances during the successive loading and removal of a plurality of pallets by means of the gantry crane.

Of advantage are shelves which are open at least at the access end and which have consoles with self-bearing pallets on the narrow sides. Such a design of the shelves allows the loading or removal of pallets with pivot arms located on the platforms of the lifting mechanisms. The free end of these pivot arms has consoles held at the correct angle by parallel guide linkages while rotating freely. The face sides of these consoles have rim face rollers which engage the understructure of the pallet. Such a design of the arrangement for loading and removing the pallet is space saving and little susceptible to trouble, since it can be constructed more stably than devices utilizing the known telescopic cylinders.

It is necessary to make sure that the pivot arms which are part of a lifting mechanism pivot simultaneously and uniformly. This is achieved, with the pivot arms forming part of the lifting table, in the best way by a servomotor acting on the pivot arms via a reverse drive.

Guide rollers on the narrow sides of the shelves and of the lifting mechanisms of the loading and removal devices at the level of the pallet girths, assure perfect movement of the pallets from the loading and removal device into and from the shelves.

Lengthy material is used herein to denote commercial lengths of rolled sections and sections produced by extrusion or drawing of metal or synthetic material, such as round rods, pipes, flat rods, U sections, etc., including wood millwork, textile bales, etc. The preferred application of the storage equipment in accordance with the present invention for lengthy material includes the storage of other material, such as small iron parts, plumbing fixtures, armatures, etc.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
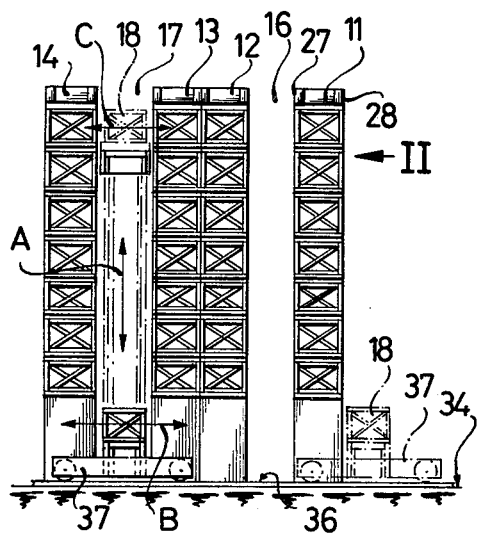
FIG. 1 shows a schematic side view of a storage arrangement in accordance with the present invention (arrow I in FIG. 2)

The storage in FIG. 1 comprises shelves 11, 12, 13 and 14 which are arranged in such a way that a passageway 17 for the vertical transport of pallets 18 (double arrow A) remains between shelves 11 and 12 and between shelves 13 and 14.

Figure 2:
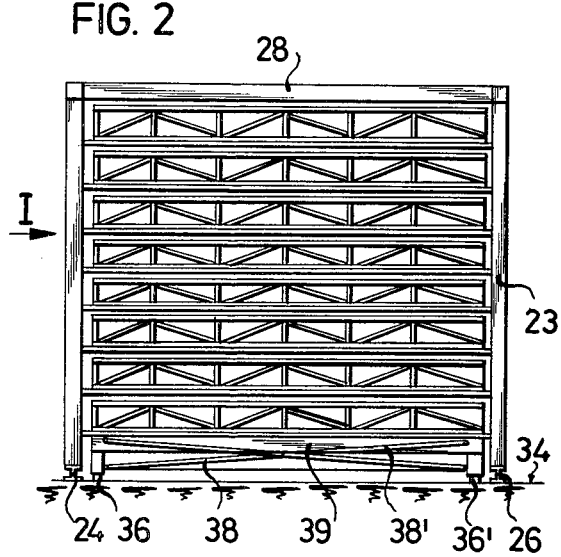
FIG. 2 shows a front view of the storage arrangement of FIG. 1.

The shelves are formed by vertical members 19, 21, 22 and 23 (FIG. 5) which are erected on beams 24 and 26 (FIG. 2) extending over the length of the storage arrangement, and are held together overhead by struts 27 and 28 extending over the width of the storage arrangement and additional struts 29, 29', 29" or 31, 31', 31" extending along the lengthwise sides of the storage arrangement in a torsion-resistant frame.

With shelves placed back to back inside the storage arrangement, two shelves are served by three vertical members on one narrow side, for example, shelves 12 and 13 in FIG. 1.

Two vertical members 19 and 21 or 22 and 23, following each other in the lengthwise direction of the storage arrangement and forming part of a shelf have consoles (cantilevers) 32 and 33 which support the pallets 18 placed on the shelves. The lowest consoles are placed at such a distance from floor 34 that there is just enough room for them to hold pallets 18.

A lazy-tong lifting table 37 which travels on rails 36, 36' is provided for the horizontal pallet transport (double arrow B). The pallet 18 to be stored is deposited on this lifting table 37 outside this storage arrangement; then pallet 18 is transferred to a passageway (17) which bounds the shelf in which pallet 18 is to be stored (say 14); pallet 18 is then lifted by means of the lifting system of the lifting table 37 to the level where the bin of the shelf is located and pallet 18 is to be stored. Finally, by means of a device, described below, which is part of the lifting table 37, for loading or removing the pallet, the pallet 18 is transferred to the assigned bin (double arrow C). The removal of stored pallets is made in the inverse order.

To stabilize the lifting mechanism, the tongs 38, 38' and the platform 39 of the lifting table become operative during the outward travel of the platform 39. Fixed guides 41 and 42 are provided on side struts 29' and 31' of the frame in which the shelves are combined. These guides support the outward traveling platform 39 via rollers 43 or 44 which are mounted on support sections 46 or 47, fastened to the face sides of platform 39.

The device for transferring the pallets 18 from the lifting table 37 to the shelf 37 or from the shelf to the lifting table 14 comprises two pivot arms 48 and 49 located on platform 39 of the lifting table 37. The free end of these pivot arms has consoles 61 or 62 free to rotate. The consoles are equipped on the face sides with rim face rollers 63 or 64 which engage the understructure 66 or 67 of pallet 18. For the simultaneous pivoting of pivot arms 48 and 49 towards the same side, there is provided a drive 68, for example, a hydraulic cylinder or servomotor which acts via a reversing drive 69, 71 and 72 on the pivot arms 48 and 49. Parallel guide linkages 73 and 74 engaging consoles 61 and 62 ensure that consoles 61 and 62 maintain their correct angle position when the pivot arms are turned.

Thus after the pivot arms 48 and 49 have discharged the pallet into the respective compartment, the lift table is lowered until the pallet 18 rests on the consoles 32, 33 and the arms 48 and 49 become disengaged from the pallet 18 (i.e. the rollers 63 and 64 become disengaged whereupon the arms 48 and 49 can be readily pivoted back to their starting position with the pallet 18 remaining in its compartment.

Guide rollers 76 and 77 on the narrow sides of the shelves above the consoles 31 and 32 and associated guide rollers 78 and 79 above platform 39 of lifting table 37 ensure a troublefree loading and removal of pallets 18.

Figure 3:
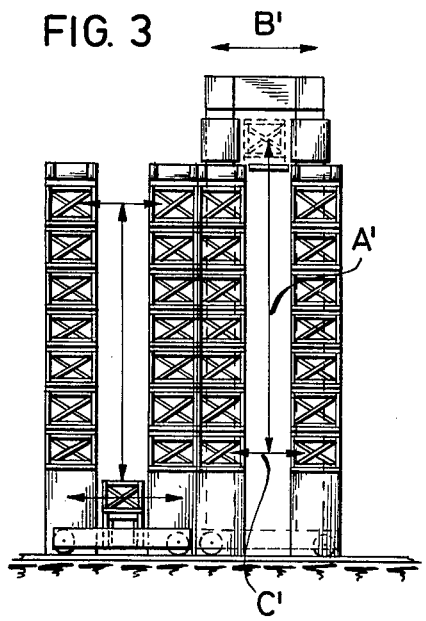
FIG. 3 shows a side view of the storage arrangement design in accordance with FIGS. 1 and 2.
Figure 4:
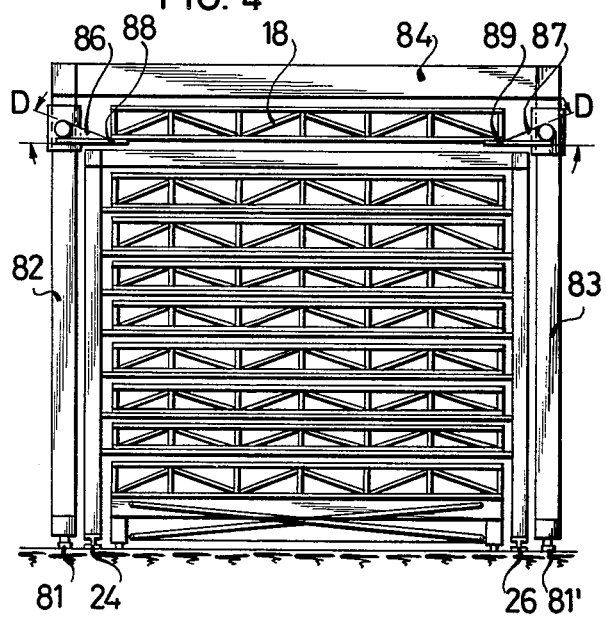
FIG. 4 shows a front view of the storage arrangement of FIG. 3.

In the storage arrangement in FIGS. 3 and 4, there is a gantry crane 82, 83, 84 which travels on rails 81, 81' and which provides shelves 11, 12, 13 and 14. A lifting mechanism can be lowered outside the storage arrangement and in passageways 16 and 17 of the storage arrangement. A device for loading and removing pallets 18 is provided.

The lifting mechanism is formed by consoles (cantilevers) 86 and 87 which are guided by the trestle bearers 82 and 83 of the gantry crane and which engage the pallets 18. These consoles can be disengaged by pivoting (double arrows D) into the vertical strut plate so that the gantry crane can be moved in the direction of arrow B' without having to raise the lifting mechanism to a level above the storage arrangement.

Figure 7:
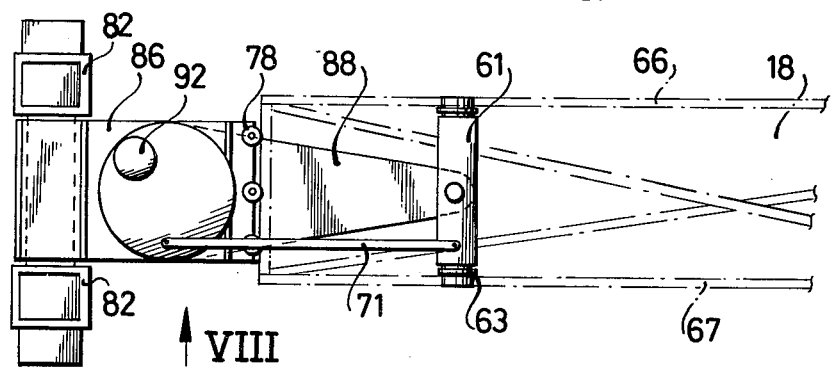
FIG. 7 shows a top view of FIG. 5, viewing a gantry (breakout view)

In turn, the consoles 86 and 87 form a platform for pivot arms 88 and 89 which are designed and function like the pivot arms 48 and 49 which are part of the lifting table. Corresponding components have corresponding reference numerals. The guide rollers 78 are mounted in a beam 91 associated with consoles 86 and 87. Pivot arms 88 and 89 are driven by synchronous electric motors 92 (FIG. 7). With the storage arrangement equipped with a traveling lifting table 37 and with a gantry crane 82, 83, 84 in accordance with FIGS. 3 and 4, it is possible to load or remove two pallets 18 simultaneously or with overlapping times without the transport of one pallet interfering with the transport of the other pallet.

Figure 5:
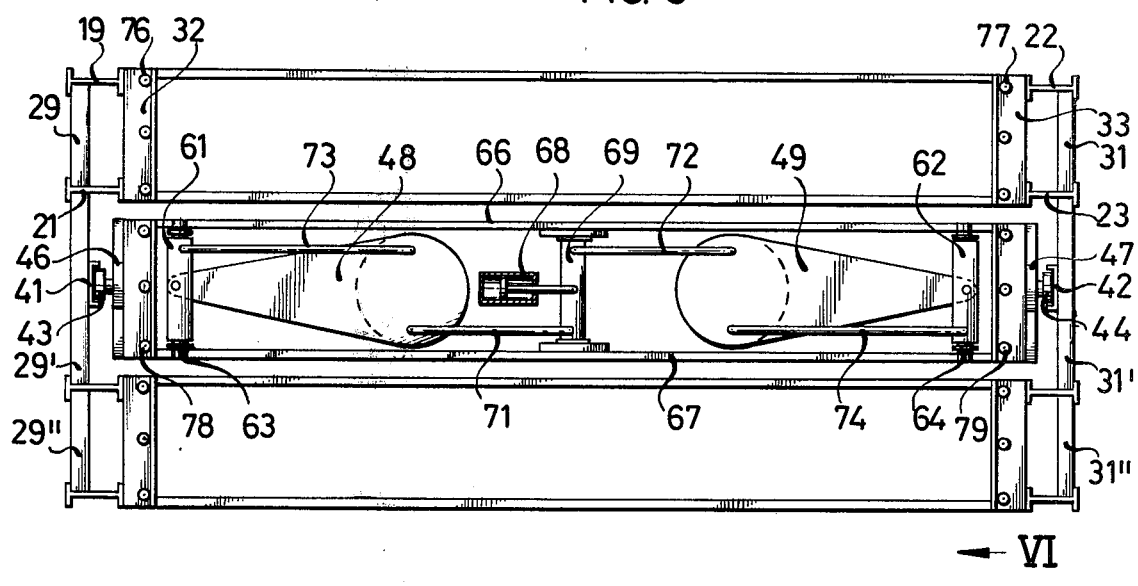
FIG. 5 shows a detailed top view on the area of two shelves adjoining a passageway, as seen in the direction of arrow V in FIG. 1.
Figure 6:
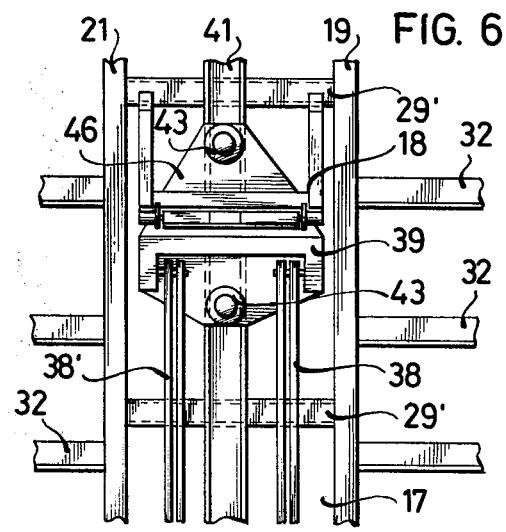
FIG. 6 shows a detail of FIG. 5 in the area of a passageway enclosed by two shelves, as seen in the direction of arrow VI in FIG. 5 on a smaller scale (breakout)
Figure 8:
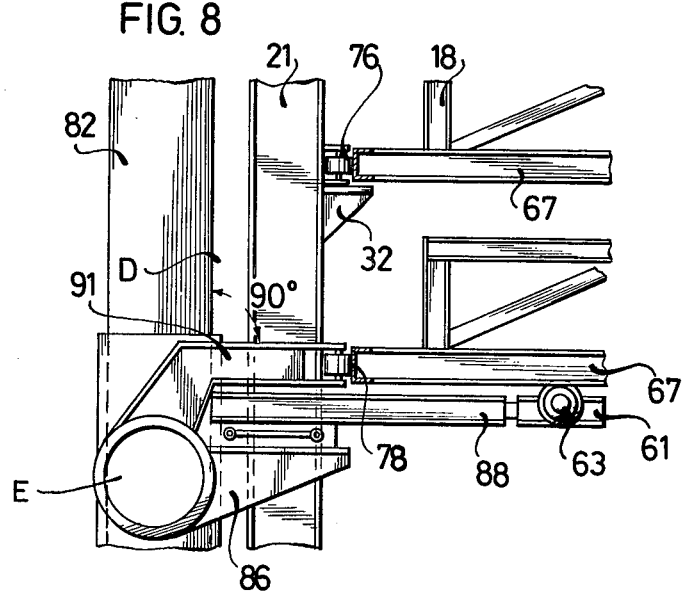
FIG. 8 shows a side view of the gantry in FIG. 7 in the direction of arrow VIII.

FIGS. 5 and 6 illustrate the lift table 37 traveling beneath the shelves whereas the FIGS. 7 and 8 are directed to the gantry device 82, 83 and 84 which travels above the shelves. The gantry device is not a modification of the embodiment in FIGS. 5 and 6; both lifting devices can be used at the same time (please see page 5, lines 1-8 of the specification). The consoles 86 and 87 of the gantry device are pivoted by means of a known per se drive about the axis E as indicated in FIG. 8 until they align with the supports 82 and 83. Thereupon the gantry can be moved into the direction of the arrow B' in FIG. 3 without having to shift the consoles 86 and 87 into the upper end position illustrated in FIGS. 3 and 4.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What I claim is:

1. An arrangement for storing pallets used for holding material, particularly lengthy material, comprising a plurality of stationary sets of shelves mounted above floor level, said sets being spaced to form access passageways between adjacent sets of shelves and each set forming a plurality of stacked pallet-accommodating compartments each accessible from one of said passageways; said compartments being also accessible from at least one broad side of the shelves; consoles engaging self-bearing pallets on narrow sides of said shelves; a loading and removal device including a lift-table for sidewise inserting pallets into and retrieving them from the respective compartments and having means traveling between adjacent sets above the height of said sets; and means forcibly guiding said device for travel underneath said shelves and transverse to the shelves; so that an individual pallet may be inserted into any freely-selected compartment or retrieved therefrom.

2. An arrangement as defined in claim 1, said lifting table having lazy-tongs and means for loading and removal of said pallets.

3. An arrangement as defined in claim 1, including lateral guide rollers for said pallets and located at a level corresponding to understructures of said pallets on narrow sides of said shelves and of lifting means of said load and removal device.

4. An arrangement for storing pallets used for holding material, particularly lengthy material, comprising a plurality of shelves located and fixed next to one another and having vertical members on said shelves, said shelves being above floor level and forming a plurality of stacked compartments for accommodating pallets and said compartments being accessible from at least one broad side of the shelves; a loading and removal device travelling transversely to said shelves underneath the shelves and including a travelling lifting table with means for loading and removal of said pallets; and guide means fixed to said vertical members for lateral support of a platform of said lifting table.

5. An arrangement as defined in claim 4, including an additional guided gantry-shaped loading and removal means traveling above said shelves.

6. An arrangement for storing pallets used for holding material, particularly lengthy material, comprising a plurality of shelves located and fixed next to one another above floor level and forming a plurality of stacked compartments, adapted to accommodate pallets and accessible from at least one broad side of said shelves; a loading and removal device travelling transversely to said shelves underneath the shelves; a guided gantry-shaped loading and removal means travelling above said shelves; and consoles guided on supports of said gantry-shaped means for forming lifting means thereof, said consoles being pivotable into a vertical plane of said supports and including means for loading and removal of pallets.

7. An arrangement for storing pallets used for holding material, particularly lengthy material, comprising a plurality of shelves located and fixed next to one another above floor level and forming a plurality of stacked compartments adapted to accommodate pallets and each being accessible from at least one broad side of said shelves; a loading and removal device guided for travel transversely to said shelves underneath the shelves, including pivotable arms having free ends; and consoles mounted on said free ends and being rotatable in a predetermined angular position through parallel-guide linkages, said consoles having rim face rollers on their sides which engage under structures of said pallets.

8. An arrangement as defined in claim 7, including common drive means for driving said pivotable arms and being part of said lifting table, said common drive means comprising a servomotor with reversible drive on said pivotable arms.

* * * * *